United States Patent [19]

Chen et al.

[11] Patent Number: 5,035,726

[45] Date of Patent: Jul. 30, 1991

[54] PROCESS FOR REMOVING OXYGEN FROM CRUDE ARGON

[75] Inventors: Michael S. Chen, Zionsville; Philip J. Cook, Schnecksville, both of Pa.

[73] Assignee: Air Products and Chemicals, Inc., Allentown, Pa.

[21] Appl. No.: 528,997

[22] Filed: May 24, 1990

[51] Int. Cl.[5] .................... B01D 53/22; B01D 71/02
[52] U.S. Cl. .......................................... 55/16; 55/68
[58] Field of Search ............... 55/16, 68, 158; 62/18; 204/129

[56] References Cited

U.S. PATENT DOCUMENTS

| | | | |
|---|---|---|---|
| 2,540,151 | 2/1951 | Weller et al. | 183/115 |
| 3,400,054 | 9/1968 | Ruka et al. | 204/1 |
| 3,713,271 | 1/1973 | Franz et al. | 55/16 |
| 3,847,672 | 11/1974 | Trocciola et al. | 55/16 X |
| 3,930,814 | 1/1976 | Gressner | 55/16 |
| 4,131,514 | 12/1978 | Chong et al. | 204/129 |
| 4,132,766 | 1/1979 | Erickson | 423/579 |
| 4,144,038 | 3/1979 | Armond | 55/58 |
| 4,174,955 | 11/1979 | Blackmer et al. | 55/158 |
| 4,198,213 | 4/1980 | Mannatt | 55/16 |
| 4,224,045 | 9/1980 | Olszewski et al. | 62/30 |
| 4,230,463 | 10/1980 | Henis et al. | 55/16 |
| 4,330,633 | 5/1982 | Yoshisato et al. | 501/152 |
| 4,340,578 | 7/1982 | Erickson | 423/579 |
| 4,382,366 | 5/1983 | Gessner | 62/31 |
| 4,466,946 | 8/1984 | Goddin, Jr. et al. | 55/16 X |
| 4,477,265 | 10/1984 | Kumor et al. | 55/26 |
| 4,545,787 | 10/1985 | Hegarty | 55/16 |
| 4,547,277 | 10/1985 | Lawless | 204/252 |
| 4,560,394 | 12/1985 | McDonald et al. | 55/16 |
| 4,639,257 | 1/1987 | Duckett et al. | 55/16 |
| 4,654,063 | 3/1987 | Auvil et al. | 55/158 X |
| 4,659,448 | 4/1987 | Gordon | 204/277 |
| 4,713,152 | 12/1987 | Walsh | 204/130 |
| 4,717,407 | 1/1988 | Choe et al. | 55/158 X |
| 4,725,346 | 2/1988 | Joshi | 204/242 |
| 4,732,583 | 3/1988 | DeLong et al. | 55/16 |
| 4,863,492 | 9/1989 | Doshi et al. | 55/158 X |
| 4,894,068 | 1/1990 | Rice | 55/16 |
| 4,931,070 | 6/1990 | Prasad | 55/16 |
| 4,934,148 | 6/1990 | Prasad et al. | 55/16 X |
| 4,950,371 | 8/1990 | McElroy | 55/158 X |
| 4,952,219 | 8/1990 | DiMartino, Sr. | 55/16 |

FOREIGN PATENT DOCUMENTS

WO 8702593 5/1987 European Pat. Off.

OTHER PUBLICATIONS

Yuan and Krogu, Stabilized Zirconia As An Oxygen Pump, *J. Electrochem. Soc.*, pp. 594–600, May 1969.

Takahashi and Iwahara, Oxide Ion Conductors Based On Bismuthsequioxide, *Mat. Res. Bull.*, vol. 13, pp. 1447–1453, 1978.

Gur and Huggins, Decomposition of Nitric Oxide Using Solid State Electrolyte, *Fast Ion Transporting Solids*, pp. 109–112, 1979.

Fukatsu et al., "On the Control of Oxygen Potential In Gas Atmosphere Using the Stabilized Zirconia Galvanic Cell As An Oxygen Pump" (1976).

Rincon-Rubio et al., "Mathematical Modeling of A Solid Electrolyte Tubular Flow Electrochemical Reactor", International Society of Electrochemistry, 35th Meeting, 8/5–8/10 (1984).

Nguyen et al., "Mechanisms of Catalytic Oxidation of Hydrocarbons In A Solid-Electrolye Fuel Cell".

Agrawa et al., "The Control of Oxygen Activities In Argon-Oxygen Mixtures By Coulometric Titration", *Journal of Electrochemical Society*, Electrochemical Service and Technology, (Mar. 1974), pp. 354–359.

Wakihara, "A Method For Removing Impurity Oxygen From Gases By Means of Air Oxygen Pump".

(List continue on next page.)

[57] ABSTRACT

A process is provided for purifying argon gas, especially an argon gas stream obtained by cryogenically separating air, wherein the argon gas is heated and compressed, and then permeated through a solid electrolyte membrane selective to the permeation of oxygen over other components of the gas, and removing oxygen from the argon by selective permeation of oxygen through the membrane. The purified argon can then be distilled to remove other components such as nitrogen.

14 Claims, 2 Drawing Sheets

OTHER PUBLICATIONS

R. E. Latimer, "Distillation of Air", *Chemical Engineering Process*, pp. 35–59, Feb. 1967.

Jennings et al., "Conceptual Processes For Recovery of Argon With Membranes In An Air Separation Process", *American Institute of Chemical Engineers*, 1987 Summer Nat'l Meeting.

Agrawal et al., "Membrane/Cryogenic Hybrid Scheme for Argon Production from Air", *American Institute of Chemical Engineers*, 1988 Summer Meeting.

*Primary Examiner*—Robert Spitzer
*Attorney, Agent, or Firm*—Geoffrey L. Chase; James C. Simmons; William F. Marsh

PROCESS FOR REMOVING OXYGEN FROM CRUDE ARGON

TECHNICAL FIELD

This invention relates to a method for removing oxygen from crude argon, and particularly for the removal of oxygen from a crude argon stream produced by cryogenically separating argon from air.

BACKGROUND OF THE INVENTION

Argon is a useful inert gas which has many applications such as in light bulbs, in the welding of metals, as inert atmosphere for steel production as well as in various electronic industries, and the like. A major source of argon is atmospheric air, about 1% of which is argon.

Commercially, argon is produced as a valuable by-product in cryogenic air separation plants for producing oxygen and nitrogen. Crude argon produced cryogenically usually contains trace amounts of nitrogen (0.02 to 1%) and appreciable quantities of oxygen (2 to 7%). This crude argon stream must be purified to reduce nitrogen and oxygen before it is suitable for use, particularly as an inert gas. Because of the proximity of the boiling point of argon (87.28° K) and oxygen (90.19° K), distillative separation of argon and oxygen in particular is very difficult and energy intensive.

Heretofore, oxygen has been removed from crude argon streams by catalytic reduction to water with excess hydrogen over platinum catalyst beds, referred to herein as the deoxo process, followed by drying to remove the water and then by dual pressure distillation to remove nitrogen and excess hydrogen. See, for example, R. E. Latimer, Distillation of Air, *Chemical Engineering Process*, pp. 35–59, February, 1967, which illustrates a typical scheme.

Although argon streams purified by this method usually contain only ppm levels of nitrogen, oxygen, and hydrogen, the process does have significant drawbacks. First, the hydrogen used in conventional cryo/deoxo processes is expensive. For example, for a crude argon stream containing only about 2.8% oxygen, about 3 mols of hydrogen are consumed for each ton of argon processed. At eight dollars per thousand standard cubic feet of hydrogen cost, the oxygen removal cost is $9.20 per ton of argon for hydrogen consumption alone. Further, hydrogen is not always conveniently available in many parts of the world.

Another shortcoming of the cryo/deoxo process for purifying argon is that the water produced from the deoxo reaction must be removed completely before the argon is fed to the final cryogenic distillation column. This requires feeding the argon stream through a dryer preliminary to the cryogenic distillation. Capital and operating costs associated with this additional step add significantly to overall cost.

Further, the excess hydrogen introduced to remove the oxygen in the first place must itself be removed and recovered before a pure argon stream can be produced. This adds further to the complexity and cost of the overall design and operation of the process.

Other techniques for purifying argon gas streams have also been suggested. For example, U.S. Pat. Nos. 4,144,038 and 4,477,265 suggest separating argon from oxygen using aluminosilicate zeolites and molecular sieves. Such processes trade argon recovery for purity.

U.S. Pat. No. 4,230,463 suggests using polymeric membranes such as polysulfones, polysiloxanes, polyaryleneoxides, polystyrenes, polycarbonate, cellulose acetate and the like for separating pairs of gases such as hydrogen and argon and polymeric membranes such as polysulfones have been suggested for the removal of oxygen from argon. Studies of hybrid processes involving cryogenic distillation and membrane separation have been reported as, see, for example, Jennings. et al., Conceptual Processes for Recovery of Argon with Membranes in an Air Separation Process, *American Institute of Chemical Engineers*, 1987 Summer National Meeting, and Agrawal, et al., Membrane/Cryogenic Hybrid Scheme for Argon Production from Air. *American Institute of Chemical Engineers*, 1988 Summer Meeting in Denver, Colo. Selectivity and recovery in such hybrid schemes has been rather poor. Much of the argon permeates with oxygen through membranes and must be recycled to crude argon distillation columns.

Therefore, there is a need in the industry for an improved process for purifying crude argon produced by cryogenic air separation.

SUMMARY OF THE INVENTION

A new process is provided for the removal of oxygen from crude bulk argon streams, particularly those produced by the cryogenic, adsorptive or membrane separation of air, which comprises feeding crude bulk argon gas over the feed side of a high temperature solid electrolyte membrane (SEM) selective to the permeation of oxygen over the other components of the gas, separating oxygen from the gas by selective permeation through the membrane to its permeate side, and recovering oxygen-depleted argon gas from the feed side of the membrane. The oxygen-depleted argon stream can then be fed to a final distillation column for the separation of argon from any other components in the gas such as nitrogen.

Preferably, crude argon obtained by cryogenic separation of air is compressed and heated, preferably to a pressure of about 30 to 80 psig and a temperature ranging from about 450°–800° C. The compressed, heated argon gas stream is then fed to a solid electrolyte membrane unit to remove oxygen either with or without the use of a sweep gas on the permeate side of the membrane to lower the permeate oxygen pressure. The oxygen-depleted effluent from the SEM is then cooled. It can be fed to a distillation column to remove any other components of the gas such as nitrogen to make a high purity argon product.

Although the SEM of the invention can be used alone to remove oxygen substantially completely from an argon gas stream, the SEM of the invention can also be used in conjunction with hydrogen-deoxidation, if desired.

DETAILED DESCRIPTION OF THE INVENTION

Although the invention will be described in further detail with reference to the accompanying drawings which illustrate preferred embodiments in which like numerals indicate like elements, it is to be understood that the invention is not limited to those embodiments.

Figure 1:
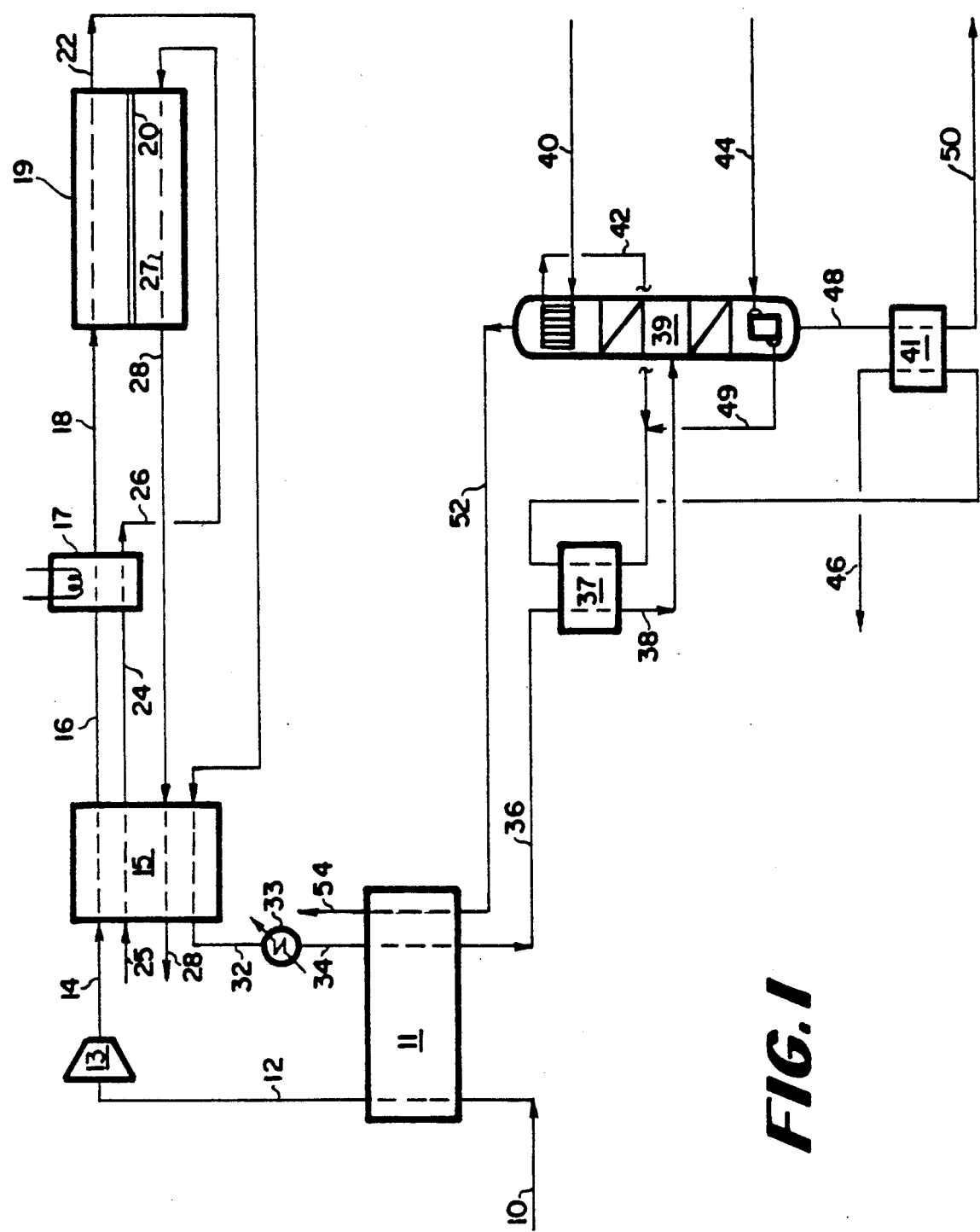
FIG. 1 is a schematic representation of a process of the invention.

FIG. 1 illustrates a scheme by which substantially all oxygen can be removed from an argon gas stream using a high temperature solid electrolyte membrane (SEM) such as $ZrO_2$ or $Bi_2O_3$ doped with $Y_2O_3$ or other oxides or mixtures thereof. The purified argon stream contains less than 1 ppm oxygen. It can then be fed to a final purification column for nitrogen removal. This embodiment is preferred because it requires no hydrogen and is therefore well-suited for a grass-roots crude argon purification plant. Not only are the deoxo unit and dryer eliminated in this embodiment but final distillation column pressure is reduced from 90 psig to about 45 psig because only nitrogen need be separated from the argon. This reduces compression power and requires a simpler single-pressure column instead of the dual-pressure column required for final argon purification by conventional processes.

In FIG. 1, low pressure crude argon stream 10 is warmed in argon heat exchanger 11. Warmed stream 12 is fed to compressor 13 and compressed to a pressure in the range of 30–80 psig, preferably 45 psig. Effluent stream 14 is heated in heat exchanger 15 from which exit stream 16 is further heated to from about 450° to 800° C. by passing it through startup heater 17. Heated stream 18 is fed to the feed side of SEM unit 19 in which the oxygen level is reduced to less than about 1 ppm by the selective permeation of oxygen through the SEM to permeate side 20.

The membrane stage comprises two electrodes and appropriate oxygen-ion conducting solid electrolyte materials, such as $ZrO_2$ or $Bi_2O_3$ doped materials, which conducts the ionized oxygen and transports it across the membrane having virtually an infinite selectivity to oxygen. The mechanism for oxygen transport is as follows:

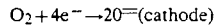

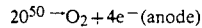

The pure oxygen emerges from the permeate side and is removed from the SEM unit either by its own pressure at about 20 psig or by using any suitable sweep gas, such as nitrogen, which comes from the upstream air separation plant as waste or gaseous nitrogen 25. Nitrogen stream 25 is warmed in heat exchanger 15 to produce effluent stream 24 which is further heated in start-up heater 17 to produce hot stream 26 which is used to sweep 27 the oxygen from SEM permeate side 20 countercurrently. This sweep gas effectively lowers the oxygen partial pressure to enable a high degree of oxygen removal from the argon stream and hence reduce the power required to pump the oxygen across the membrane. Exiting permeate stream 28 is cooled in heat exchange 15 and returned to an upstream cryogenic unit for further separation of oxygen and nitrogen.

Argon stream 22 exiting SEM membrane unit 19 is cooled in heat exchanger 15, the effluent stream 32 from which is further cooled by cooler 33 and passed 34 on to argon heat exchanger 11.

Cooled, substantially oxygen-free argon stream 36 is then further cooled to a cryogenic temperature in heat exchanger 37 preparatory to removal of nitrogen therefrom. Cryogenic stream 38 is fed to single-pressure distillation column 39 which is refluxed at the top by the vaporization 42 of liquid nitrogen 40 and reboiled at the bottom by cooling gaseous nitrogen stream 44. Purified argon 48 is withdrawn from the bottom of column 39 and warmed in heat exchanger 41 to produce product argon stream 50.

Nitrogen stream 52 exits the top of column 39 and passes through argon heat exchanger 11. Nitrogen exit stream 54 can then be disposed of as desired; for example, it can be dumped into a waste stream or vented or used with pure gaseous nitrogen as a sweep gas for the SEM unit or the like.

Warmed nitrogen 49 from the column bottom reboiler is mixed with the vaporized overhead nitrogen stream 42 and warmed in heat exchangers 37 and 41. Effluent 46 is returned for use in the upstream air separation plant.

Figure 2:
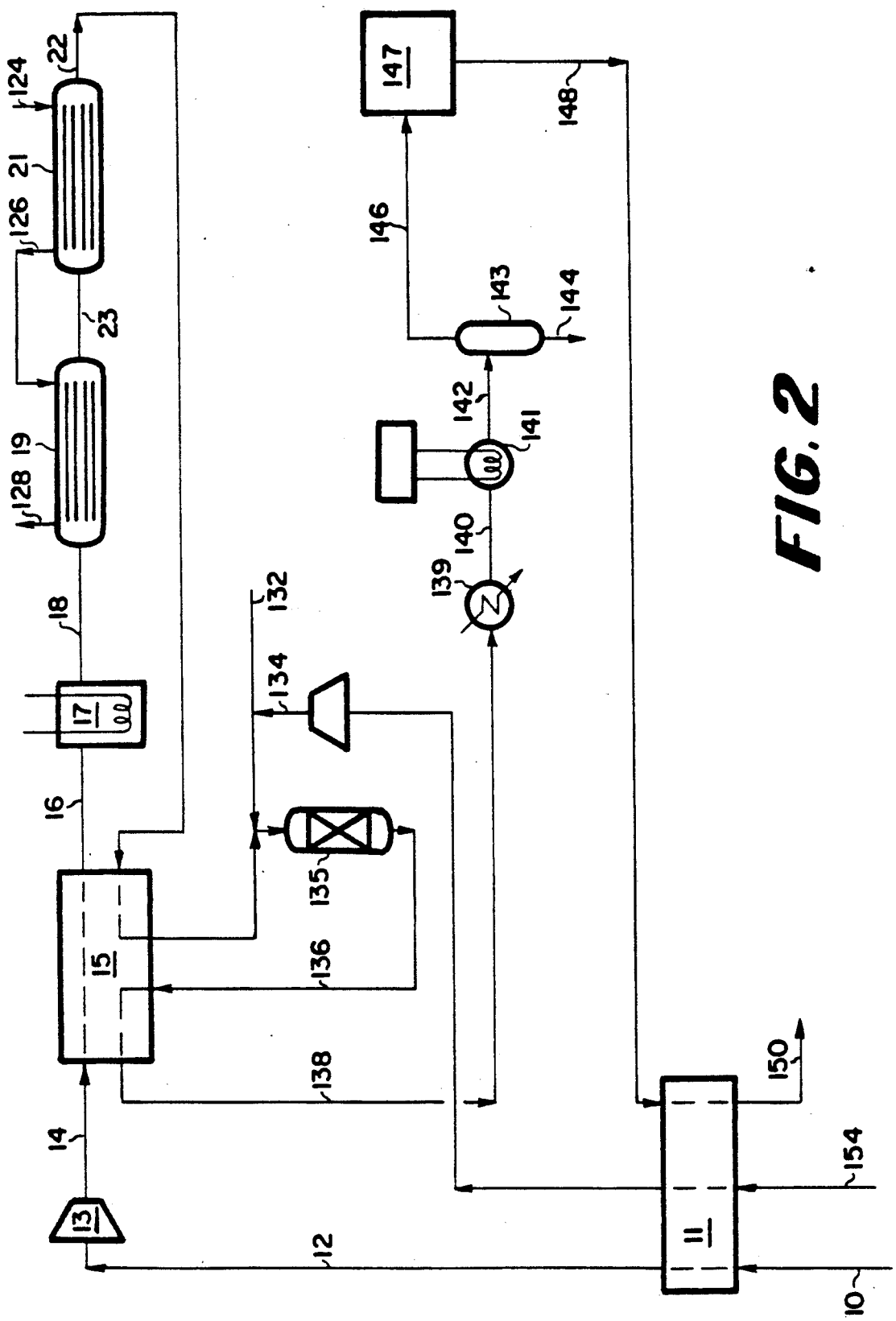
FIG. 2 is a schematic representation of an embodiment of the invention incorporating the deoxo process.

FIG. 2 illustrates a hybrid SEM/deoxo process for near complete removal of oxygen from crude argon. In this embodiment, the objective is to use the SEM for bulk removal of oxygen (about 90–95%) and to use the hydrogen deoxo unit to remove the remaining oxygen from the argon. This embodiment is well adapted to retrofit an exiting deoxo unit thereby increasing the capacity of the existing plant facility and reducing the hydrogen consumption.

Low pressure crude argon stream 10 containing about 2.8% oxygen is warmed in argon heat exchanger 11. Exit stream 12 is fed to compressor 13 to about 90 psig. Discharge stream 14 is heated in the range of about 560°–750° C. in heat exchanger 15. Hot argon stream 16 is passed through startup heater 17 to the feed sides of the two-stage solid electrolyte membrane units 19 and 21 in which oxygen is removed from argon stream 18 by selective permeation thereof through SEM units 19 and 21 to produce intermediate purified argon stream 23 and exit purified argon stream 22. The permeate stream emerges on the permeate side as pure oxygen at about 20 psig, either by its own pressure or mixed with any suitable sweep gas such as nitrogen 124 fed countercurrently through the units to produce intermediate stream 126 and exit stream 128. The oxygen contained in stream 22 from the SEM units is reduced to about 0.15%. This stream is then cooled in heat exchanger 15 and mixed with hydrogen 132 and recycled hydrogen/argon stream 134. The mixture of the three streams is fed to catalytic deoxo unit 135 in which the oxygen is reduced to about 1 ppm by reaction with hydrogen to produce water. Effluent stream 136 is cooled in heat exchanger 15 and exit stream 138 is cooled in cooler 139. Exit stream 140 is further cooled in glycol cooler 141. Resulting stream 142 is fed to separator 143 from which water is removed as stream 144 and overhead dehydrated argon stream 146 is passed to molecular sieve unit 147 for final drying. Dehydrated stream argon stream 148, still containing unremoved nitrogen and excess hydrogen is cooled in argon heat exchanger 11. Effluent stream 150 is then fed to a final distillation column (not shown) from which pure argon is obtained. Excess hydrogen containing some argon is returned as stream 154 from the final distillation column and warmed in argon heat exchanger 11 to be used as hydrogen source stream 134.

Any suitable high temperature solid electrolyte membrane (SEM) unit design can be employed in the invention. For example, a shell-and-tube configuration with the crude argon on the shell side can be used. The tubes, made of solid electrolyte materials, are coated with electron conducting electrodes and connected to an external DC power source. Other configurations include plate-and-frame and honeycomb (monolithic layer) geometric configurations. Power input, current density, applied voltage and membrane area can all be properly designed and calculated based on electrolyte electrode materials, thickness, and ionic conductivity.

Tables 1, 2, and 3 illustrate three different SEM unit designs. Design 1 uses $ZrO_2$-$Y_2O_3$ at 750° C. with pure oxygen in the permeate. Design 2 uses $Bi_2O_3$-$Y_2O_3$ at 560° C. with pure oxygen in the permeate. Design 3 is the same as Design 1 except that a nitrogen sweep gas is used to lower the oxygen permeate pressure and, hence, to reduce the electrical power consumption. All of the above designs are more cost-effective than the conventional cryogenic/hydrogen deoxo process for removing oxygen from crude argon gas streams. For example. Design 1 when used to retrofit an existing deoxo unit is estimated to save about 70% of the hydrogen cost. When Designs 2 and 3 are used in a grass-roots plant, capital cost savings as high as 10% on top of no cost at all for hydrogen consumption are easily realized.

TABLE 1

SEM DESIGN #1

Description: $ZrO_2$—$Y_2O_3$ @ 750° C.
Shell: Crude Argon @ 90 psia
Total Flow Inlet: 30.32 moles/hr
$O_2$ (inlet): 2.8%
Tube: Pure $O_2$ @ 20 psia

| Stage | Crude Argon $O_2$ Conc. In/Out (ppm) | $O_2$ Removed (moles/hr) | Power (KW) | Area (ft²) | Applied Voltage (volts) | $O_2$ Removed % Feed |
|---|---|---|---|---|---|---|
| 1 | 28000/9190 | .5755 | 6.16 | 39.3 | 0.22 | 68.8 |
| 2 | 9190/1470 | .230 | 2.46 | 41.7 | 0.22 | 27.1 |
| 3 | 1470/216 | .0371 | 0.40 | 42.9 | 0.22 | 4.37 |
| 4 | 216/43 | .0051 | 0.06 | 40.2 | 0.22 | 0.60 |
| 5 | 43/7.5 | .00105 | 0.01 | 39.8 | 0.28 | 0.12 |
| 6 | 7.5/1.0 | 1.91E-4 | 0.003 | 50.0 | 0.30 | 0.01 |

Other:
Temp. Rise Across SEM: 200° F.
Area for High Temperature H-X: 110 Ft²
SEM Total Power: 9.02 KW
SEM Total Area: 254 Ft² (1 ppm $O_2$)
<100 Ft² (0.15% $O_2$)

TABLE 2

SEM DESIGN #2

Description: $Bi_2O_3$—$Y_2O_3$ @ 750° C.
Shell: Crude Argon @ 90 psia
Total Flow Inlet: 30.32 moles/hr
$O_2$ (inlet): 2.8%
Tube: Pure $O_2$ @ 20 psia

| Stage | Crude Argon $O_2$ Conc. In/Out (ppm) | $O_2$ Removed (moles/hr) | Power (KW) | Area (ft²) | Applied Voltage (volts) | $O_2$ Removed % Feed |
|---|---|---|---|---|---|---|
| 1 | 28000/9190 | .5755 | 4.48 | 39.70 | 0.16 | 67.8 |
| 2 | 9190/1470 | .230 | 1.79 | 42.76 | 0.16 | 27.1 |
| 3 | 1470/216 | .0371 | 0.29 | 45.17 | 0.16 | 4.37 |
| 4 | 216/43 | .0051 | 0.47 | 39.9 | 0.18 | 0.60 |
| 5 | 43/7.5 | .00105 | 0.11 | 40.8 | 0.22 | 0.12 |
| 6 | 7.5/1.0 | 1.91E-4 | 0.002 | 46.3 | 0.26 | 0.02 |

Other:
Temp. Rise Across SEM's: ~145° F.
Area for High Temperature H-X: 110 Ft²
SEM Total Power: 6.6 KW
SEM Total Area: 255 Ft² (<1 ppm $O_2$)
<100 Ft² (0.15% $O_2$)

TABLE 3

SEM DESIGN #3

Description: $ZrO_2$—$Y_2O_3$ @ 750° C.
Shell: Crude Argon @ 90 psia
Total Flow Inlet: 30.32 moles/hr
$O_2$ (inlet): 2.8%
Tube: Total Flow Inlet: 20 moles/hr $N_2$ (sweep gas)
$O_2$ Conc. Inlet: 2 ppm
Pressure: 20-25 psia

| Stage | Crude Argon $O_2$ Conc. In/Out (ppm) | Sweep Gas $O_2$ Conc. In/Out (ppm) | $O_2$ Removed (moles/hr) | Power (KW) | Area (ft²) | Applied Voltage (volts) | $O_2$ Removed % Feed |
|---|---|---|---|---|---|---|---|
| 1 | 28000/9190 | 13490/40720 | .5755 | 5.04 | 40.6 | 0.18 | 67.8 |
| 2 | 9190/1470 | 2170/13490 | .230 | 1.68 | 43.2 | 0.15 | 27.1 |
| 3 | 1470/216 | 319/2170 | .0371 | 0.18 | 44.8 | 0.10 | 4.37 |

TABLE 3-continued

SEM DESIGN #3

Description: $ZrO_2$—$Y_2O_3$ @ 750° C.
Shell: Crude Argon @ 90 psia
Total Flow Inlet: 30.32 moles/hr
$O_2$ (inlet): 2.8%
Tube: Total Flow Inlet: 20 moles/hr $N_2$ (sweep gas)
$O_2$ Conc. Inlet: 2 ppm
Pressure: 20-25 psia

| Stage | Crude Argon $O_2$ Conc. In/Out (ppm) | Sweep Gas $O_2$ Conc. In/Out (ppm) | $O_2$ Removed (moles/hr) | Power (KW) | Area (ft$^2$) | Applied Voltage (volts) | $O_2$ Removed % Feed |
|---|---|---|---|---|---|---|---|
| 4 | 216/43 | 64/319 | .0051 | 0.02 | 40.6 | 0.075 | 0.60 |
| 5 | 43/7.5 | 11.5/64 | .00105 | 0.004 | 43.8 | 0.075 | 0.12 |
| 6 | 7.5/1.0 | 2/11.5 | .60019 | 0.001 | 46.1 | 0.10 | 0.02 |

Other:
Temp. Rise Across SEM's: ~80° F.
Area for High Temperature H-X: 500 Ft$^2$
Total Power: (SEM & Sweep Comp.): 6.93 + 7 = ~14 KW
SEM Total Area: 259.1 Ft$^2$ (<1 ppm $O_2$)

The SEM units or cells can be constructed of any suitable solid electrolyte materials, or mixtures thereof, which are capable of transporting oxygen ions at high temperatures (e.g. 1000°-2000° F.[535°-1100° C.]). By applying an external power input through electrodes and an electric circuit, the ionic nature of the membrane allows it to transport or "pump" oxygen from a region of low partial pressure to a region of higher pressure. The selectivity of such membranes for oxygen is very high because the ionic transport mechanism would not be operative for other combustion gas components.

Examples of some such solid electrolyte materials which may be used include bismuth oxide, zirconia, and the like doped with various oxides such as yttria, calcia, barium oxides, and the like. Preferably bismuth oxide doped with calcia is used. Most preferably, bismuth sesquioxide-based materials are used because they have very high ionic conductivities.

Any suitable electrode materials having high electronic conductivity as well as high oxygen transport properties can be used such as, for example, silver, platinum, lanthanum-strontium-magnesium oxide (SLM), lanthanum-strontium-cobalt oxide (LSC), and the like. Preferably, LSM oxides are used for their high conductivities and thermal compatibility with the solid electrolyte materials.

The electrolyte membrane can have any suitable thickness, preferably in the range of from about 10 to 1000 micrometers, most preferably 20 to 100 microns, and can have any suitable oxygen conductivity such as, for example, conductivities in the range of about 0.01 to 2 ohm$^{-1}$ cm$^{-1}$, preferably 0.5 to 1 ohm$^{-1}$ cm$^{-1}$. The electrodes can have any suitable thickness and can be situated on either side of the electrolyte membrane. The electrodes are preferably porous and operated at any suitable current density, preferably ranging from about 0.05 to 2 amperes/cm$^2$, most preferably 0.5 to 1 ampere/cm$^2$.

Electrodeless SEM cells composed of a thin solid electrolyte film without electrodes can also be used. Suitable solid electrolyte materials can be any mixed conductors having high oxygen ionic and electronic conductivities such as Co-Sr-Bi, Co-La-Bi, Co-Sr-Ce, Co-La-Ce oxides, and the like, with oxygen ionic conductivities in the range of about 0.01 to 1 ohm$^{-1}$ cm$^{-1}$ and electronic conductivities in the range of about 1 to 30 ohm$^{-1}$ cm$^{-1}$, most preferably with ionic conductivities in the range of about 0.5 to 1 ohm$^{-1}$ cm$^{-1}$ and electronic conductivities in the range of about 10 to 25 ohm$^{-1}$ cm$^{-1}$. The electrodeless SEM cells are preferably operated by maintaining an oxygen pressure on the feed side such that a positive driving force for oxygen ion transport can be achieved in the absence of an externally applied voltage and power source. The electrons released at the anode would flow back to the cathode side through the mixed conductor film itself without going through electrodes and an external electrical circuit. One particular advantage of such a cell is a significant reduction in overpotential loss associated with electrode SEM cell systems.

Solid electrolytes as disclosed in U.S. Pat. Nos. 3,400,054; 4,131,514; 4,725,346, the disclosures of which are hereby incorporated herein by reference, and the like can also be employed.

The use of high temperature solid electrolyte membranes to remove oxygen from a crude bulk argon stream from cryogenic, adsorptive or membrane air separation plants by the processes of the invention provides considerable advantage over the conventional hydrogen deoxo process for the same purpose. For example, the invention eliminates or reduces the need for hydrogen and hydrogen storage capacity which are expensive. The need for a deoxo catalytic system and dryer is eliminated or reduced. A simpler final purification distillation column can be used (single pressure versus dual pressure) for argon/nitrogen separation and hydrogen/argon recovery and recycle are obviated. The crude argon compression requirement is lowered to 45 versus 90 psig and overall capital and operating costs are lowered significantly. Bulk argon is deemed to be that volume of argon that is usually handled commercially as opposed to bench-scale, experimental or laboratory quantities. For such bulk quantities of argon the process of the present invention has been shown to be unexpectedly and advantageously efficient and economical.

Although the invention has been described in considerable detail in the foregoing, it is to be understood that such detail is solely for the purpose of illustration and that variations may be made by those skilled in the art without departing from the spirit and scope of the invention except as set forth in the claims.

What is claimed is:

1. A process for purifying bulk argon which comprises recovering a crude bulk argon gas containing oxygen from a cryogenic, adsorptive or membrane separation of air, heating the crude argon gas to a temperature of from about 450° to 800° C. and compressing the crude argon gas to a pressure of about 30 to 80 psig, feeding the heated, compressed gas to a high temperature solid electrolyte membrane selective to the permeation of oxygen over other components of the gas, and separating oxygen from the argon gas by selective permeation of oxygen through the membrane.

2. The process of claim 1 wherein the oxygen in the argon gas stream is reduced to less than about 1 ppm.

3. The process of claim 2 wherein the oxygen gas is permeated through two or more membranes.

4. The process of claim 1 wherein the membrane is made of mixed conductors with mixed conductivity for oxygen ions and electrons.

5. The process of claim 4 wherein the oxygen is permeated through a doped zirconia membrane.

6. The process of claim 5 wherein the membrane is doped with yttrium oxide.

7. The process of claim 4 wherein the oxygen is permeated through a doped bismuth oxide membrane.

8. The process of claim 7 wherein the membrane is doped with yttrium oxide.

9. The process of claim 1 wherein a sweep gas is used to lower permeate oxygen pressure.

10. The process of claim 1 which comprises feeding the argon gas from the membrane to a distillation column to separate argon from any other components of the gas.

11. The process of claim 10 wherein nitrogen is separated from argon in the distillation column.

12. The process of claim 1 which comprises subjecting the argon gas from the membrane to hydrogen deoxidation.

13. The process of claim 12 which comprises feeding the argon gas from the hydrogen deoxidation to a distillation column to separate argon from any other components of the gas.

14. The process of claim 13 wherein nitrogen is separated from argon in the distillation column.

* * * * *